Jan. 4, 1949.  L. T. COOKSON  2,457,977
CONTINUOUS INJECTION MACHINE
Filed Oct. 27, 1945  6 Sheets-Sheet 1
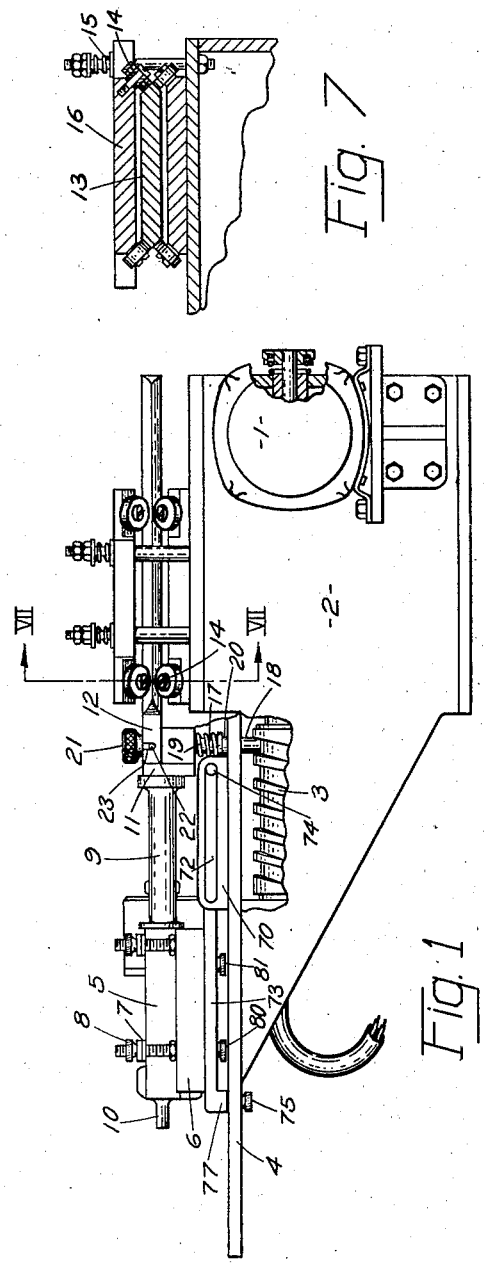
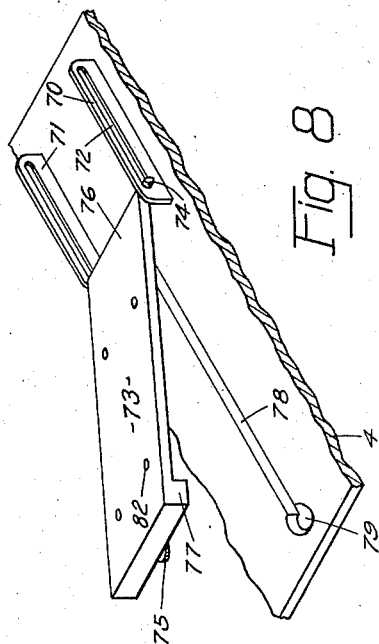
INVENTOR
LEONARD T. COOKSON
ATTORNEY Jan. 4, 1949.  L. T. COOKSON  2,457,977
CONTINUOUS INJECTION MACHINE
Filed Oct. 27, 1945  6 Sheets-Sheet 2

INVENTOR
LEONARD T. COOKSON
BY
ATTORNEY

Jan. 4, 1949.  L. T. COOKSON  2,457,977
CONTINUOUS INJECTION MACHINE
Filed Oct. 27, 1945  6 Sheets-Sheet 3

INVENTOR
LEONARD T. COOKSON

Jan. 4, 1949.   L. T. COOKSON   2,457,977
CONTINUOUS INJECTION MACHINE
Filed Oct. 27, 1945   6 Sheets-Sheet 4

INVENTOR
LEONARD T. COOKSON
ATTORNEY

Jan. 4, 1949. L. T. COOKSON 2,457,977
CONTINUOUS INJECTION MACHINE
Filed Oct. 27, 1945 6 Sheets-Sheet 5

INVENTOR
LEONARD T. COOKSON
BY
ATTORNEY

Jan. 4, 1949. L. T. COOKSON 2,457,977
CONTINUOUS INJECTION MACHINE
Filed Oct. 27, 1945 6 Sheets-Sheet 6

INVENTOR
LEONARD T. COOKSON
BY
ATTORNEY

Patented Jan. 4, 1949

2,457,977

UNITED STATES PATENT OFFICE 2,457,977

CONTINUOUS INJECTION MACHINE

Leonard T. Cookson, Kalamazoo, Mich., assignor to The Upjohn Company, Kalamazoo, Mich., a corporation of Michigan Application October 27, 1945, Serial No. 625,058

9 Claims. (Cl. 128—218)

This invention relates to a continuous injection machine and particularly to the type thereof which provides a slowly moving and closely controllable supply of fluid for injection into an animal for testing purposes.

In the art of investigating the effects upon an animal, such as a white rat, of various compositions and in the art of assaying the strength of a composition by its effect upon an animal, such as a white rat, it frequently becomes necessary to inject into the animal a liquid material comprising or containing the composition in question. This injection is usually carried on at an extremely slow rate of speed, sometimes taking as much as twenty-four hours to inject a few, such as six, cubic centimeters of a liquid solution. It is necessary, however, that in spite of the slow rate of injection the flow be kept very steady and constant in order to secure useful results from the test.

These experiments are often carried out with groups of animals so that it is further desirable for convenience and economy of equipment that the injection mechanism be equally usable on one or a plurality of animals without requiring adjustment, without measurably changing the speed at which the fluid will be caused to flow, and assuring equal flow into each animal.

Accordingly, the principal object of my invention has been to provide a device for injecting a fluid into an animal at a steady and closely controllable rate of flow.

A further object of my invention has been to provide a device for causing a fluid to flow at an extremely slow rate while maintaining a high degree of control over the rate of flow.

A further object of my invention has been to provide a device which will operate with equal accuracy, and without the necessity of special adjustment, whether it is operating on one animal or on a plurality of animals.

A further object of my invention has been to provide a device as aforesaid which is relatively simple so that a minimum of adjustment is required and that which is essential can be easily effected.

Other objects and purposes of my invention will be apparent to those acquainted with equipment of this type upon a reading of the following specification and inspection of the accompanying drawings.

In the drawing:

Figure 1 represents a side partially broken view of a machine embodying my invention.

Figure 7 is a section taken on the line VII—VII of Figure 1.

Figure 8 is an oblique view of a portion of the syringe holding platform with the syringe and its holding blocks removed.

Figure 2:
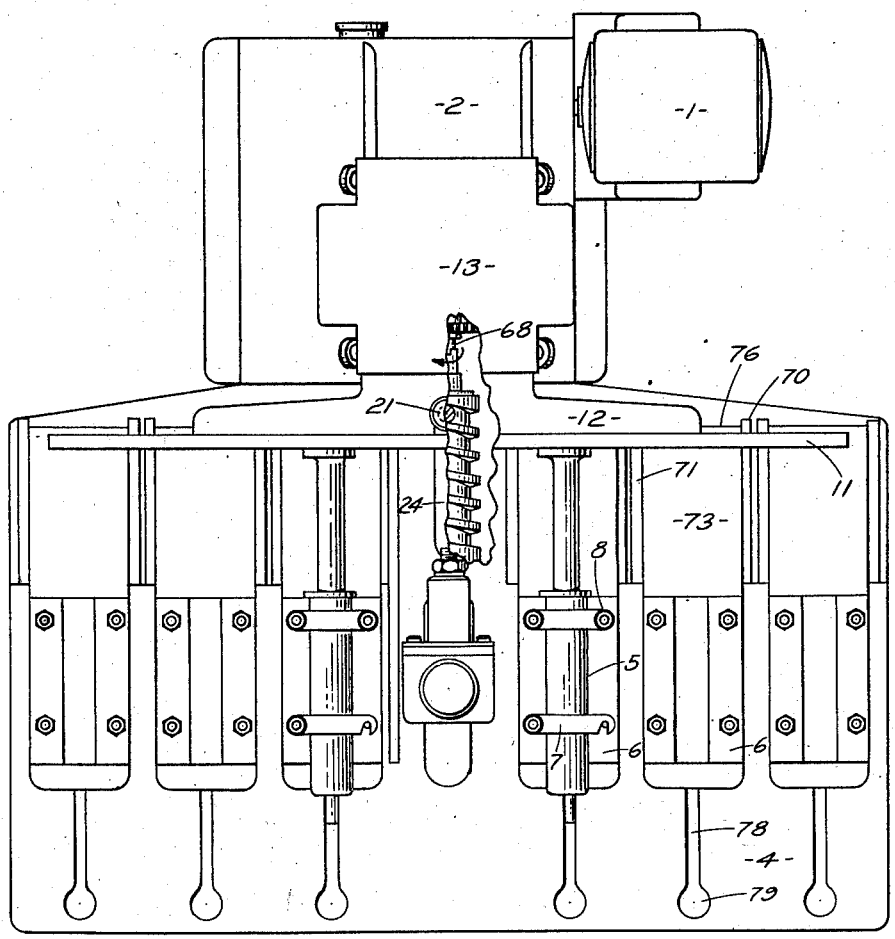
Figure 2 represents a top partly broken view of a machine embodying my invention.
Figure 3:
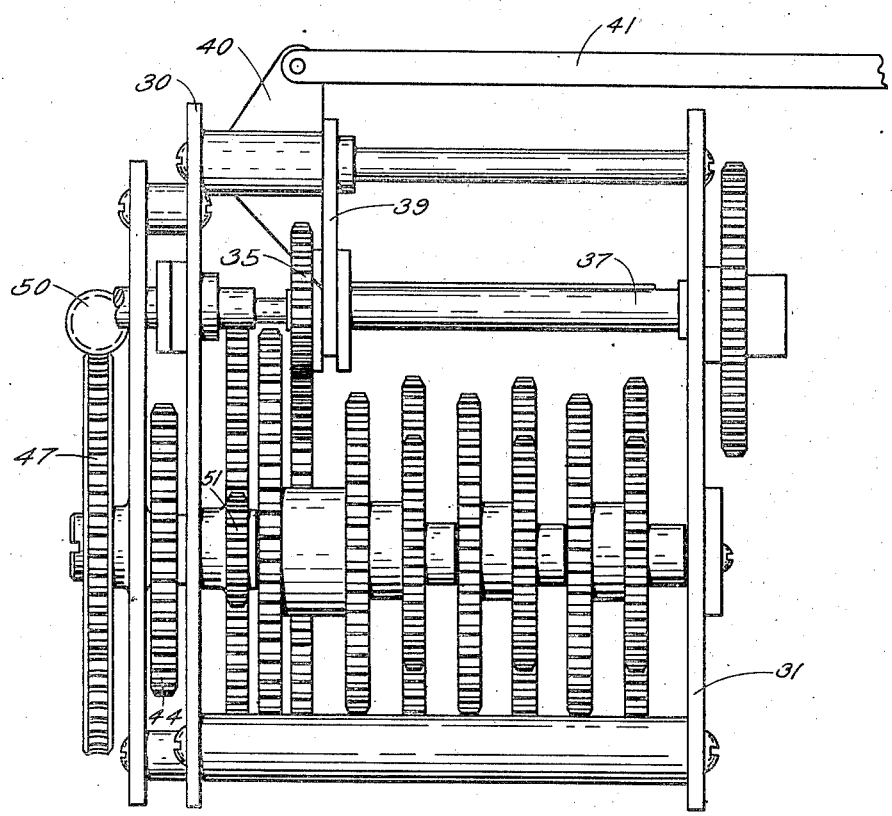
Figure 3 represents a side partially schematic view of the gear box showing the arrangement of the gears therein.
Figure 4:
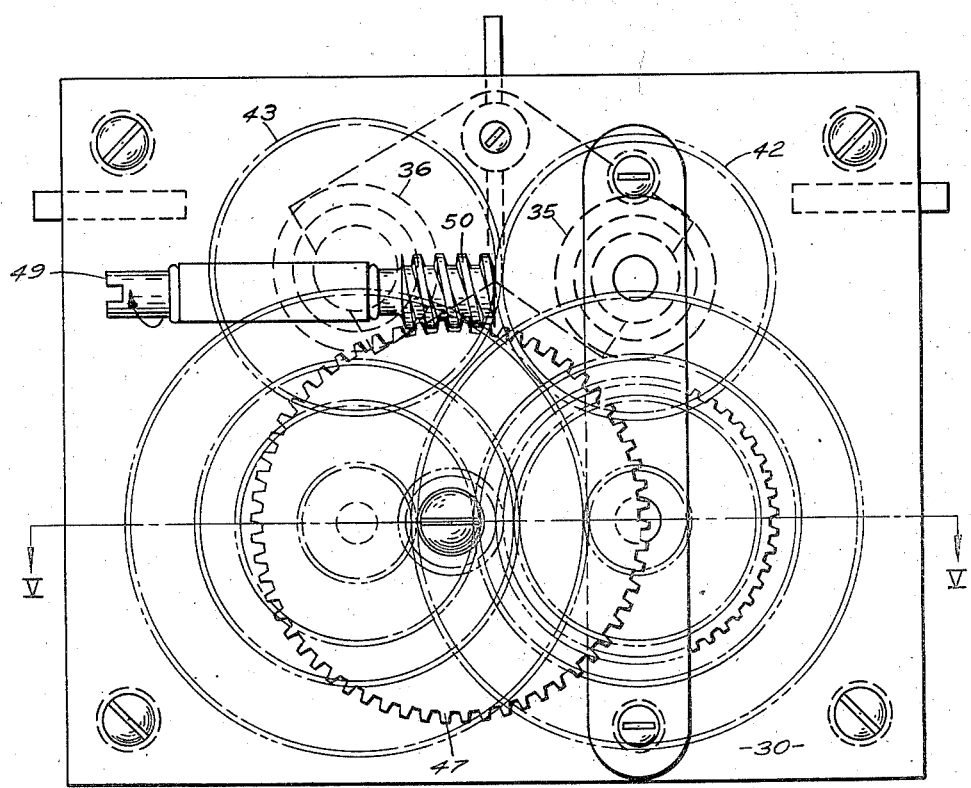
Figure 4 shows an end partially schematic view of the gear box showing the arrangement of gears therein.
Figure 5:
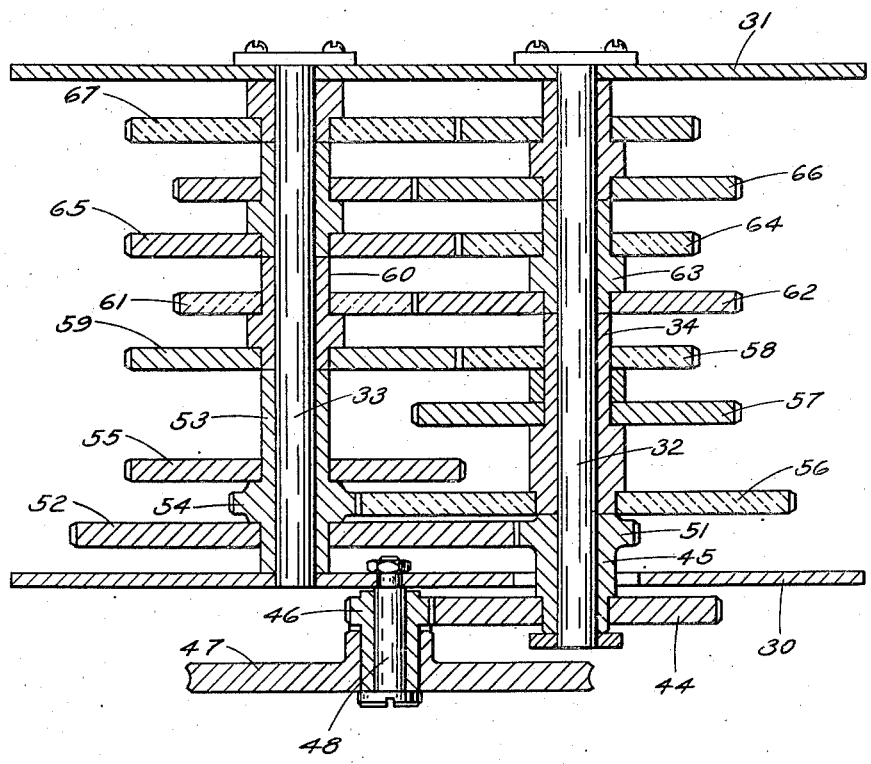
Figure 5 is a section taken on the line V—V of Figure 4.
Figure 6:
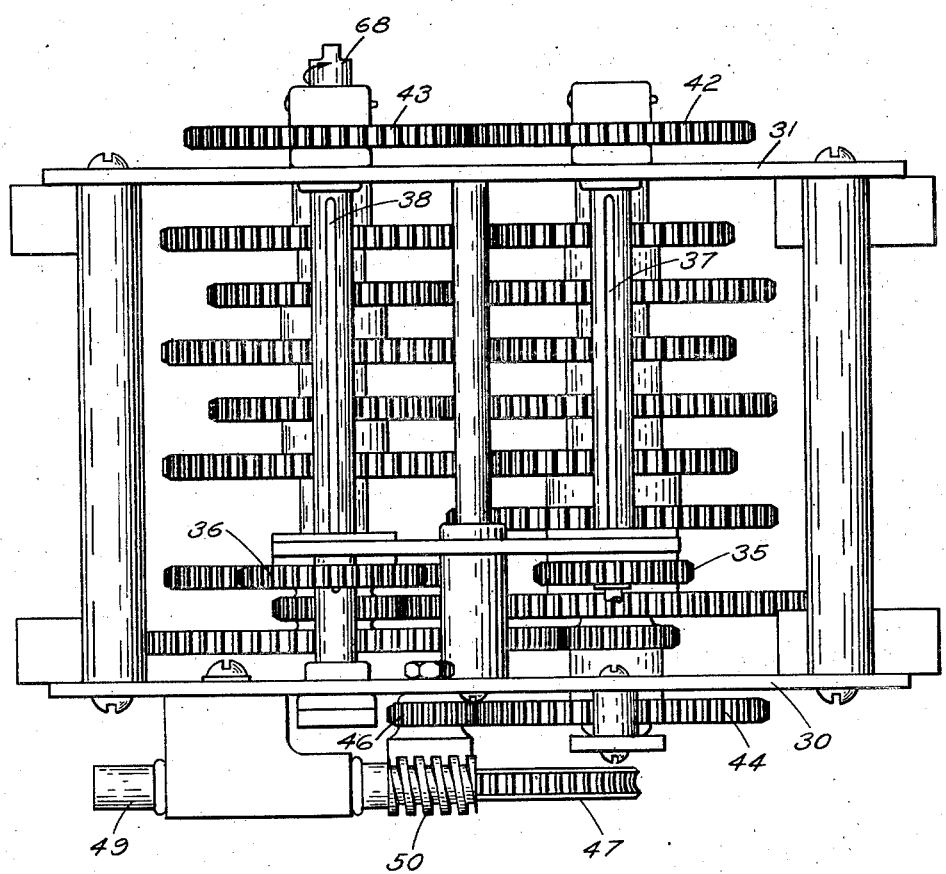
Figure 6 is a top, partially schematic view of the gear box showing the arrangement of gears therein.

In providing a machine to carry out the purposes above outlined I have provided in general a motor driving a worm through a series of speed reduction gears having therein provision for speed adjustment, and the worm through suitable mechanism driving a cross-head which bears against the plungers of as many syringes as may conveniently be placed against it. Because of the great reduction in speed by the said gears, only a small fraction of the motor's available horse power is utilized even for driving the six syringes shown in the drawing. Since the standard electric motor at no load, or at substantially no load, runs close to a constant speed, the syringes will be operated within all measurable limits at the same speed whether there are one or six syringes in place. It will also be observed that by the provision of a larger motor, which can be applied very readily, the cross-head can be lengthened and the device made to drive a still greater number of syringes with only minor and easily made modifications.

Referring now more specifically to the drawings and for the present to Figures 1 and 2, there is shown a motor 1 operatively connected with the contents of the gear box 2 from which is driven a worm 3 whose length is at least as great as the stroke of the plungers in the syringes to be used. It will be observed that for reasons apparent hereinafter the worm helix is square cut.

At the front of the gear box there is provided the platform 4 upon which are mounted the syringes 5. These latter are mounted in any convenient manner, as by supporting base elements 6 each having a pair of hook straps 7 held in place by suitable knurled nuts 8. Each syringe has a plunger 9 and a discharge nipple 10. The plungers of the syringes are driven by a cross-head 11 which may be of any length needed to engage the several plungers which are to be operated by the device. The cross-head is suitably backed by a bracing element 12 which is made integral with, or is connected to, the guide plate 13. This guide plate extends over the gear box 2 and is supported by suitable rollers 14 which are arranged as shown in detail in Figure 7. By spring loading, as at 15, the upper roller supporting plate 16, there is secured a constant pressure by the upper rollers onto the guide plate 13 which holds it firmly in position, without, however, materially interfering with the ease with which it is enabled to reciprocate.

The cross-head 11 may be returned to its initial position at any time during or after the operation of the machine by lifting the pin 17 and thereby disengaging it from the worm. Once this has been done, the cross-head can be manually reset in any desired position and the syringe pistons restored to the initial setting. Where, however, it is desired to re-extend only one of the syringe pistons, without moving the cross-head, the platform 73 may be relocated forward and the piston re-extended the desired amount.

Located in the backing plate 12 is a pin 17 (Figure 1) by which the cross-head is driven. This pin extends at its lower end 18 between the elements of the worm 3 and it is held in position by the spring 19 operating against a collar 20. The pin is, however, vertically slidable so that it can be lifted upwardly by the knurled head 21 and means are provided for selectively holding it in a raised position, such as a cross-bar 22 which is turned into a slot 23 when it is desired to lower the pin into position to engage the worm 3. The pin 17 extends through and reciprocates in the slot 24 of the platform 4.

While several types of mechanism may be provided to support the syringe mount 6 on the platform 4 in proper relationship with the cross-head 11, I have found it convenient to provide a pair of guides 70 and 71 each having a longitudinal slot 72 and positioned on either side of a movable platform 73. The syringe mounting block 6 is supported on this movable platform and is held in place by stud bolts 80 and 81 extending thereinto through the openings 82. One end 76 is held by a pair of pins 74, said pins being received into the slots 72 of the strips 70 and 71. The other end of the platform 73 preferably has a turned-down portion 77 to act as a platform supporting foot and receives threadedly therein a thumb screw 75. Said thumb screw extends through the slot 78 in the platform 4. The above described mounting arrangement will suffice to accommodate one syringe. It may be increased in width as desired to support two or more syringes. However, to provide maximum flexibility for the entire device each such arrangement should mount only one syringe and the arrangement repeated for each additional syringe employed.

The purpose of this portion of the construction is to permit any individual syringe to be placed in any desired position longitudinally of its stroke with respect to the cross-head 11 and also to permit it to be tipped upwardly for the purpose of bleeding air out of the syringe cylinder at such times as occasions therefor may arise during the operation of this apparatus and regardless of the position the syringe plunger may then occupy. Merely by loosening the thumb screw 75 the syringe may be adjusted longitudinally of its stroke with respect to the cross-head 11 into any desired position within the physical limits of the apparatus in order that, for example, a full syringe may be started when other syringes being operated are partially depressed. When it is necessary to bleed air out from the syringe cylinder the operator merely loosens the thumb screw 75, and moves the entire syringe holding means forward until the head of the screw 75 is aligned with the enlargement 79 at the end of the slot 78. The discharge end of the syringe may then be lifted upwardly with the platform 75 pivoting on the pins 74 as shown in Figure 8. When the air is properly released, the syringe is then replaced in operating position and use thereof may be commenced with a minimum expenditure of time.

Turning now to the construction of the gear box as shown in Figures 3, 4, 5 and 6 there appears first a front frame plate 30 and a rear frame plate 31 which comprise part of the frame of the entire structure and function as supporting means for the contents of the gear box. A pair of fixed shafts 32 and 33 (Figure 5) extend from the front plate to the back plate and are held in place with respect thereto by any suitable means. Freely turning on said shafts are a plurality of gear units which are selectively meshed by one of the pair of connecting gears 35 and 36 (Figure 6) to provide the desired speed. A pair of shafts 37 and 38 are provided above the shafts 32 and 33 for carrying respectively, the said connecting gears 35 and 36. The said gears 35 and 36 are slidable on the shafts 37 and 38 and are caused to move thereon by any suitable means such as the yoke 39 operated through the slide and plate assembly 40 by a manually operated control rod 41. The gears 42 and 43 at the back of the gear box (Figure 6) are mounted fixedly on the shafts 37 and 38 respectively, for turning therewith and are arranged to mesh with each other. A drive gear 44 is mounted on the hub 45 for turning therewith. The pinion 46 and the gear 47 are mounted for turning together on the stub shaft 48, which is supported by the front frame plate 30.

The motor is attached at the coupling 49 and drives the worm 50 which in turn drives the gear 47 at a greatly reduced rate of speed. The gear 47 operating through the hub upon which it mounted (Figure 5) drives the pinion 46 which in turn drives the gear 44. This gear operating through the hub 45 upon which it is mounted drives the pinion 51 which drives the large gear 52 and in turn the hub 53. This hub drives the pinion 54 and the first take-off drive 55. The pinion 54 drives the large gear 56 which, operating through the hub 34, drives the second take-off gear 57 and the pinion 58. It will be noted that the pinion 58 on this hub is somewhat larger than the pinion 54 on the preceding hub 53. The pinion 58 drives the gear 59 which in turn the hub 60 and through it the pinion 61. This pinion drives the gear 62, which in turn drives the hub 63 and through it the pinion 64. This procedure continues on through the rest of the gears as shown in the manner already described. The two take-off gears 35 and 36 travel side by side as determined by the yoke 39 and may be positioned so that one of them may selectively be in mesh with one of the gears 55, 57, 59, 62, 65, 66 and 67. This will drive one of the shafts 37 or 38. If the shaft 37 is the one driven it will drive the gear 42 which in turn will drive the gear 43 which will rotate the coupling 68 of the shaft 38. Since the worm 3 is operatively affixed to the coupling 68 (Figure 2) the rotation of said coupling will rotate the worm. If the position of the take-off gears 35 and 36 is such that the shaft 38 is the one driven, then the coupling 68 will be driven directly and the shaft 37 will merely idle.

It will be evident that the mechanism herein-disclosed can be easily designed to cover a wide range of desirable speeds and that by selecting a motor of the proper horsepower it can be made to operate one or a large number of syringes without measurable change in speed. Accordingly, there is secured a highly flexible device which will meet the requirements, objects and purposes above stated.

Other modifications may be made in this device without departing from the spirit of my invention and such modifications will be scope of the hereinafter appended claims, excepting as said claims themselves provide otherwise.

I claim:

1. In a machine for actuating a plurality of syringes, the combination comprising: a source of rotary motion; means for selectively reducing the velocity of said rotary motion and translating it into lineal motion; a cross-head mounted for reciprocating motion; means responsive to said lineal motion effecting movement of said cross-head; means for individually mounting said plurality of syringes for independent and dissimilarly timed cooperation with said cross-head including a plurality of platforms mounted for selective adjustment axially of said syringes; means for individually, and releasably locking said platforms against such axial movement and means for mounting a syringe on and demounting same from each of said platforms, all so arranged and constructed that the syringes may be individually actuated at predetermined separate periods and may be individually mounted or demounted all without interfering with the movement of said cross-head.

2. In a fluid injection machine mounting a plurality of syringes and including a source of power at selectable speeds for actuating said syringes through a single cross-head, the improvement in the means for mounting said syringes comprising: a plurality of platforms mounted for selective movement axially of said syringes; means for locking the platforms against such axial movement in a selected position; means for mounting and demounting a syringe on each of said platforms.

3. In a fluid injection machine for actuating a plurality of syringes at a pre-determinable constant velocity, the combination comprising: a prime mover supplying rotary motion at a substantially constant velocity, a selective speed reduction transmission and a worm driven thereby; means providing positive engagement between said selective transmission and said source of motion; a cross-head and means supporting and guiding same closely adjacent said worm for reciprocating motion parallel to the axis thereof; a retractable pin carried by said cross-head detachably cooperating with said worm for translating said rotary motion into lineal motion whereby said cross-head will be moved in one direction of reciprocation, means holding said syringes in a position fixed axially with respect to said worm including a plurality of platforms mounted for adjusting movement axially of said worm; means for individually and releasably locking said platforms against such axial movement, and means for mounting and demounting a syringe on each of said platforms.

4. In a fluid injection machine for actuating a plurality of syringes at a pre-determinable constant velocity, the combination comprising: a prime mover supplying rotary motion at a substantially constant velocity; a selective, velocity reducing transmission driving a worm; a means providing positive engagement between said selective transmission and said source of motion; a cross-head and means supporting and guiding same for reciprocating motion adjacent to and parallel with said worm; a retractable pin carried by said cross-head detachably engaging said worm for translating said rotary motion into lineal motion whereby said cross-head will be moved in one direction of reciprocation; means holding syringes in a position fixed axially with respect to said worm said means comprising a plurality of platforms mounted for selective movement axially of said worm; a base supporting said platforms containing elongated openings of variable width; headed means fixed to each platform at one end thereof and each passing through one of said openings and tightenable against said base for individually locking the platforms against said axial movement; a pair of strips attached to said base each including an elongated opening and projections at the other end of said platforms passing into said openings in the strips, all so arranged and constructed that the platforms may be individually longitudinally adjusted and individually elevated on said one end; means for mounting and demounting a syringe on each of said platforms.

5. In a fluid injection machine mounting a plurality of syringes and including a source of power for actuating said syringes at selectable speeds through a single cross-head, the improvement in the means for mounting said syringes comprising: a plurality of platforms mounted for selective movement parallel to the direction of movement of said cross-head; a base supporting said platforms containing elongated openings of variable widths; headed means fixed to each platform at one end of each of said platforms and each passing through one of said openings and tightenable against said base for individually locking the platforms against movement parallel to the direction of movement of said cross-head; a pair of strips attached to said base each including elongated openings and projections at the other end of said platforms passing into said openings in the strips, all so arranged and constructed that the platforms may be individually longitudinally adjusted and individually elevated on said one end and means for mounting and demounting a syringe on each of said platforms.

6. In a fluid injection machine for actuating a plurality of syringes at a predeterminable constant velocity the combination comprising: a source of rotary motion operating a worm; a cross-head and means supporting and guiding same closely adjacent said worm for reciprocating motion parallel to the axis thereof; a retractable pin carried by said cross-head detachably cooperating with said worm for translating said rotary motion into lineal motion whereby said cross-head will be moved in one direction of reciprocation, means holding said syringes in a position fixed axially with respect to said worm including a plurality of platforms mounted for adjusting movement axially of said worm; means for individually and releasably locking said platforms against such axial movement and means for mounting and demounting a syringe on each of said platforms.

7. In a fluid injection machine for actuating a plurality of syringes at a predeterminable constant velocity, the combination comprising: a source of rotary motion including a selective transmission; a cross-head mounted for rectilinear reciprocating motion only; a worm positioned between the ends of said cross-head and axially parallel to the line of said reciprocating motion; a pin passing through said cross-head and engaging the threads of said worm, said pin being retractable to be disengaged from said worm, said cross-head being moved in one direction of reciprocation by motion transmitted thereto through the pin from the worm; means removably holding a plurality of syringes in a fixed position axially parallel to the movement of said cross-head, and with the plungers thereof each against said cross-head whereby movement of said cross-head in said one direction will move each of said plungers an equal distance and the cross-head and plungers may be moved manually in the other direction upon manual retraction of said pin.

8. In a fluid injection machine for actuating a plurality of syringes at a predeterminable constant velocity, the combination comprising: a source of rotary motion and a selective transmission; a cross-head mounted for rectilinear reciprocating motion only; a worm, axially parallel with the line of said reciprocating motion and driven by said transmission, mounted below and substantially midway between the ends of said cross-head and having a length at least equal to the maximum stroke of said cross-head; a pin passing through said cross-head and engaging the threads of said worm, said pin being retractable to be disengaged from said worm, said cross-head being moved in one direction of reciprocation by motion transmitted thereto through the pin from the worm; means removably holding a plurality of syringes in a fixed position axially parallel to the movement of said cross-head whereby movement of said cross-head in said direction will move each of said plungers an equal distance and the cross-head and plungers may be moved manually in the other direction upon manual retraction of said pin.

9. In a fluid injection machine for actuating a plurality of syringes at a predeterminable constant velocity, the combination comprising: a source of rotary motion and a selective transmission; roller guides and a cross-head mounted therebetween for rectilinear reciprocating motion only; a worm, axially parallel with the line of said reciprocating motion and driven by said transmission, mounted below and substantially midway between the ends of said cross-head and having a length at least equal to the maximum stroke of said cross-head; a pin passing through said cross-head and engaging the threads of said worm, said pin being retractable to be disengaged from said worm, said cross-head being moved in one direction of reciprocation by motion transmitted thereto through the pin from the worm; resilient means holding said pin in worm engaging position; means removably holding a plurality of syringes in a fixed position axially parallel to the movement of said cross-head and with the plungers of each thereof against said cross-head, whereby movement of said cross-head in said one direction will move each of said plungers an equal distance and the cross-head and plungers may be moved manually in the other direction upon manual retraction of said pin.

LEONARD T. COOKSON.

REFERENCES CITED

The following references are of record in the file of this patent:

UNITED STATES PATENTS

| Number | Name | Date |
|---|---|---|
| 1,176,042 | Eaton | Mar. 21, 1916 |
| 1,966,498 | Gross | July 17, 1934 |
| 2,093,344 | Wandel | Sept. 14, 1937 |
| 2,270,804 | Dutky et al. | Jan. 20, 1942 |

FOREIGN PATENTS

| Number | Country | Date |
|---|---|---|
| 466,183 | France | May 16, 1914 |